United States Patent [19]
Spence

[11] Patent Number: 5,879,114
[45] Date of Patent: Mar. 9, 1999

[54] AUTOMATIC BOAT TO TRAILER LATCH

[76] Inventor: Wendell Lee Spence, P.O. Box 1034, East Jordan, Mich. 49727

[21] Appl. No.: 901,079

[22] Filed: Jul. 28, 1997

[51] Int. Cl.$^6$ ..................................................... B60P 7/06
[52] U.S. Cl. ................................ 410/77; 410/69; 410/2; 410/80; 280/414.1
[58] Field of Search ............................... 410/69, 77, 80, 410/81, 2, 3, 7; 414/536; 114/344; 292/341.15, 341.17; 280/414.1, 508

[56] References Cited

U.S. PATENT DOCUMENTS

| | | |
|---|---|---|
| 3,750,805 | 8/1973 | Finney . |
| 3,938,829 | 2/1976 | Anderson . |
| 3,989,267 | 11/1976 | Robinson . |
| 4,114,920 | 9/1978 | Boettcher . |
| 4,463,965 | 8/1984 | Lawson . |
| 4,641,851 | 2/1987 | Knies . |
| 4,826,200 | 5/1989 | Tingley ........................ 414/536 X |
| 4,919,446 | 4/1990 | Higgins ........................ 280/414.1 |
| 5,000,471 | 3/1991 | Sumrall . |
| 5,120,079 | 6/1992 | Boggs . |
| 5,193,835 | 3/1993 | Sheets ........................ 280/414.1 |
| 5,599,035 | 2/1997 | Spence . |
| 5,683,214 | 11/1997 | Jeffreys ........................ 410/77 |

FOREIGN PATENT DOCUMENTS

22461 9/1917 Denmark .................. 292/341.17

*Primary Examiner*—Stephen T. Gordon

[57] ABSTRACT

This invention is an automatic boat to trailer latch permitting a one-person operation by a person either in the boat or in the water behind it, in light or in darkness, which allows that person to align the boat's bow with the latching mechanism, without sacrificing control of the boat.

5 Claims, 7 Drawing Sheets

AUTOMATIC BOAT TO TRAILER LATCH

CROSS-REFERENCE TO RELATED APPLICATION

Design change from original U.S. Pat. No. 5,599,035, issued Feb. 4, 1997, (additional version no. 1).

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

This invention relates to boat trailers, and more specifically to an automatic latching mechanism for attaching and holding a trailered boat to the receiving trailer.

One of the frequent difficulties encountered in trailering a boat is the necessity of assistance in aligning the boat to the trailer, and once so aligned, in affixing it to the trailer so that it may be removed from the water with the trailer.

Trailered boats, in general, are launched and recovered by utilizing a towing vehicle and submerging the trailer in water to a point where the boat may, in launching, be freely floated from the trailer when the latching device holding the boat to the trailer is released, and, conversely, upon recovery, the boat may be floated onto the trailer, held in place by an appropriate latching device, and so secured, removed with the trailer from the water by the towing vehicle.

While apparently simple in concept, the recovery process becomes significantly more difficult when wind and water conditions are less then ideal. Recovery of a boat utilizing a trailer on a calm water surface, with no wind, in daylight and with assistance of others, may be accomplished quite easily with most available boat to trailer latching mechanisms, automatic or not.

Choppy water surfaces, cross-winds and night recovery situations, however, make recovery of a trailered boat a much more tenuous task, particularly when assistance is not readily available.

Various devices are available which ostensibly permit one person boat recovery operations, by providing some type of self-activating locking mechanism. However, for the most part, they presume conditions where, if assistance is not available, conditions will readily permit one person to align the boat, move it over the trailer and, in so doing, activate the locking mechanism. Available devices do not facilitate one-person recovery operations in less than ideal conditions.

Specifically, an optimal automatic boat to trailer latch must permit one-person operation, where water surface disturbance causes pitching which prevents point to point vertical alignment of the boat being recovered and the trailer for any significant period of time.

An optimal automatic boat to trailer latch must permit one person operation under cross wind conditions which prevent longitudinal alignment of the boat being recovered and the trailer during the boat's approach over the trailer.

An optimal automatic boat to trailer latch must permit one-person operation by a person either in the boat or in the water behind it in light or in darkness, by allowing that person to align the boat's bow with the latching mechanism and to observe when the latching operation is complete, without sacrificing control of the boat.

In many instances, sportsmen, recreational boaters, or commercial operators of small trailered boats must recover their craft without assistance. Recovery is often after dark or before dawn. Further, recovery, unlike launch, cannot wait for ideal water and weather conditions.

As noted, existing self-activating locking mechanism for affixing boats to trailers to not satisfy the above requirements.

BRIEF SUMMARY OF THE INVENTION

This invention is directed to the provision of an automatic boat to trailer latch which will permit one-person recovery operations not dependent upon ideal conditions.

More specifically, this invention is directed to the provision of an automatic boat-to-trailer latch that is especially designed to allow the automatic latch mechanism to operate in water-surface conditions where point to point vertical alignment of the boat being recovered and the recovery trailer is difficult or impossible to maintain for any significant period of time.

A more specific object is to provide an automatic boat to trailer latch which permits recovery operations in cross wind conditions, by providing a guidance mechanism which permits the latch to operate without requiring precise longitudinal alignment of the boat being recovered and the trailer during all stages of recovery, including the boat's approach to and over the trailer.

The latch assembly of the present invention is of the type including a latch bar adapted to be secured to the prow of the boat. According to an important feature of the invention, this includes an elongated generally vertically extending latch bar portion spaced forwardly of the prow. This configuration allows operation in choppy surfaces when the prow positions in which the latching/recovery operation may be completed. Such a configuration additionally facilitates utilization in cross wind situations, by providing an extended, elongated contact surface for guiding the latch bar into latching position. The forwardly spacing of the latch bar from the prow also provides a greater margin for error in aligning the boat for the recovery operation.

According to a further feature of the invention, the latch assembly includes a latch structure adapted to be mounted on the forward end of the boat trailer, which further includes a housing defining a vertically extending slot opening in the rear, upper, and lower faces of the housing and sized to receive the latch bar portion therein. This arrangement ensures proper vertical alignment of the boat relative to the trailer upon latching because of the required vertical alignment of the latch bar and latch structure. Essentially, the latch bar functions as male member and the latch structure as female member of the entire latch assembly.

According, to a further feature of the invention, the latch structure further includes a bolt having a spring-loaded end with means of swiveling at the spring end. This arrangement allows the elongated bar on the prow of the boat to push past the latching bolt resulting in the spring snapping the swivel end back into position, securing the male latch bar member in the female latch structure, thus locking the boat to the trailer.

According to a further feature of the invention, a means is provided for mounting the bolt on the housing structures for rotational movement. The spring-loaded latch bolt is locked in the receiving position to the housing with a pin. In line with the spring-loaded latch bolt and coming from the opposite side is a safety locking bolt which also is pinned to the housing in the lock position. To release the boat from the trailer, the pin would be removed on the safety locking bolt and the bolt would be pulled outward to the release position. Then the pin on the spring-loaded latch bolt would be removed and the bolt turned one half turn, allowing the elongated bar to pull the spring-loaded end outward, releasing the boat.

According to a further feature of the invention, the latch structure further includes funnel means extending rearwardly from said slot and operative to direct the latch bar portion into the slot. The vertical extent of the latch bar portion is at least as great as the vertical extent of the slot. The funnel means may comprise guide bars extending rearwardly from the entrance of said slot and diverging rearwardly so as to provide a wide mouth target for the male latch bar portion. This arrangement facilitates recovery operations in cross winds or other situations where longitudinal alignment of the boat or trailer is difficult or impossible to maintain during the entire approach and recovery process. The funnel means contacts the male vertically extending latch member and guides the latch member to the female vertical slot.

DETAILED DESCRIPTION OF THE INVENTION

The invention latch assembly, broadly considered, includes a latch bar 10 and a latch structure 11.

Latch bar 10 is adapted to be secured to the prow of the boat 12. It is spaced forwardly from the prow of the boat 12 and is elongated and generally vertically extending.

Latch structure 11 is adapted to be mounted on the forward end of the boat trailer 14. Latch structure 11 includes a housing 15 sized to receive the latch bar portion 10 in slot opening. Housing 15 has six reinforced areas, three on each side, for mounting safety locking bolt, spring-loaded latch bolt, and guide bars.

Figures 8, 9:
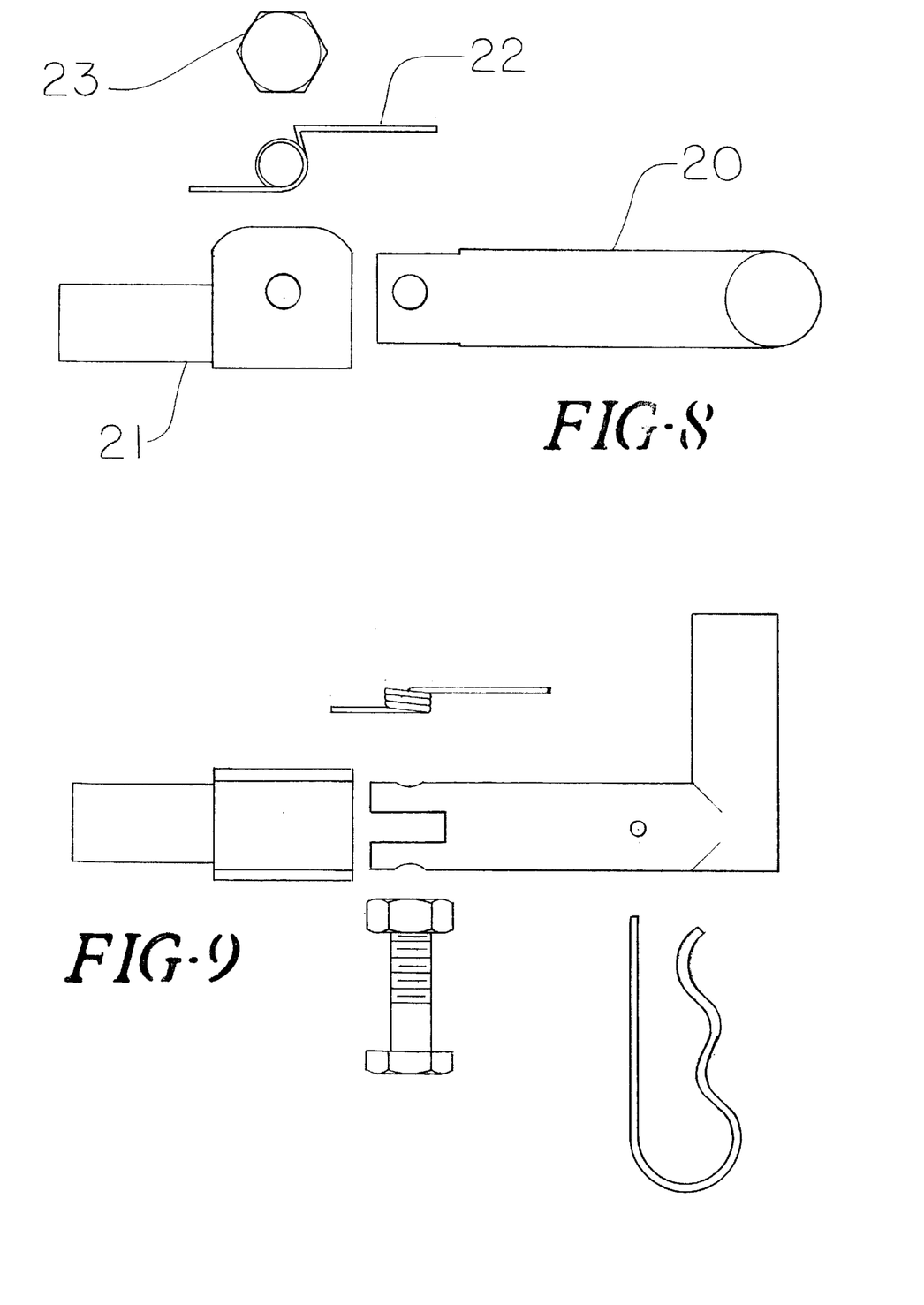
FIG. 8 is breakdown of spring-loaded latch bolt.
FIG. 9 is side view of FIG. 8.
Figure 10:
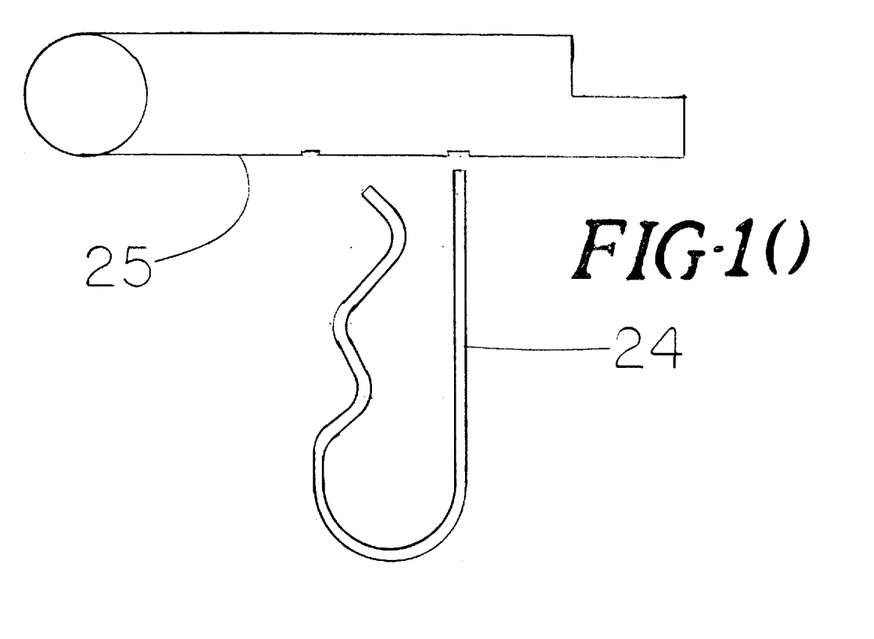
FIG. 10 is top view of safety locking bolt pin.

A spring-loaded latch bolt 20 is mounted horizontally on the housing 15 to allow for a rotating movement one half turn, which allows the spring-loaded end 21 of latch bolt 20 to swivel back. The spring-loaded latch bolt assembly consists of four parts, 20, 21, 22, 23, shown in FIG. 8.

Figure 1:
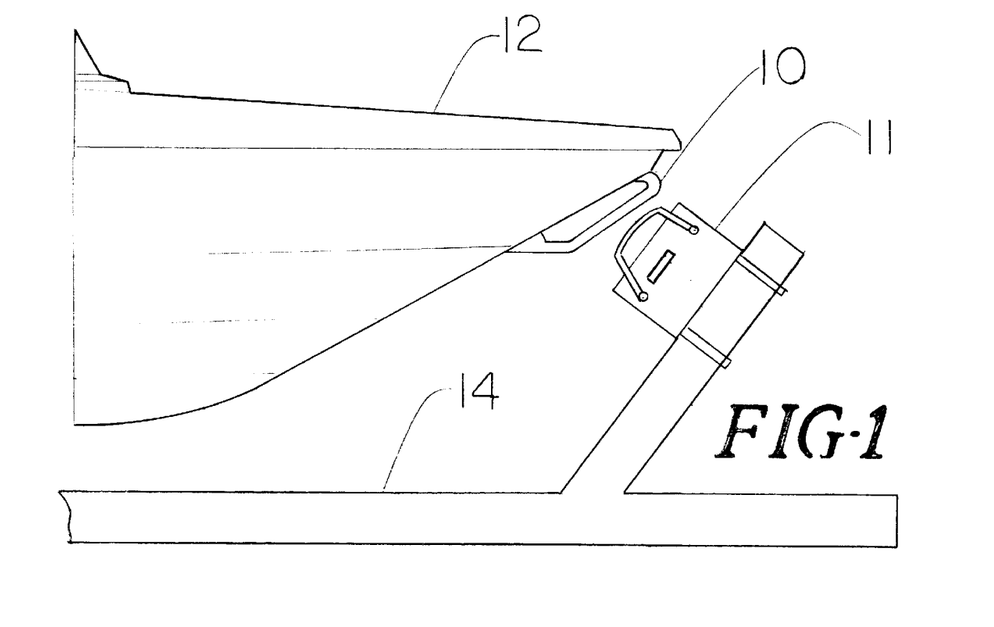
FIG. 1 is a side elevational view of an automatic boat to trailer latch, mounted on a boat and trailer according to the invention.
Figure 2:
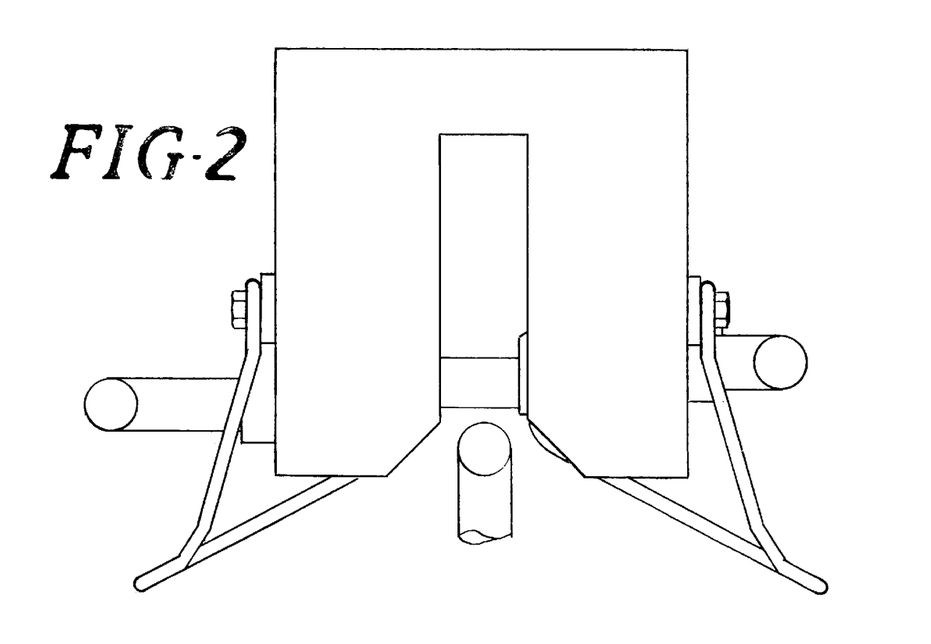
FIG. 2 is a top view of the component parts of the invention, with the spring-loaded latch bolt and the safety locking bolt and male latch member in operative position.
Figure 3:
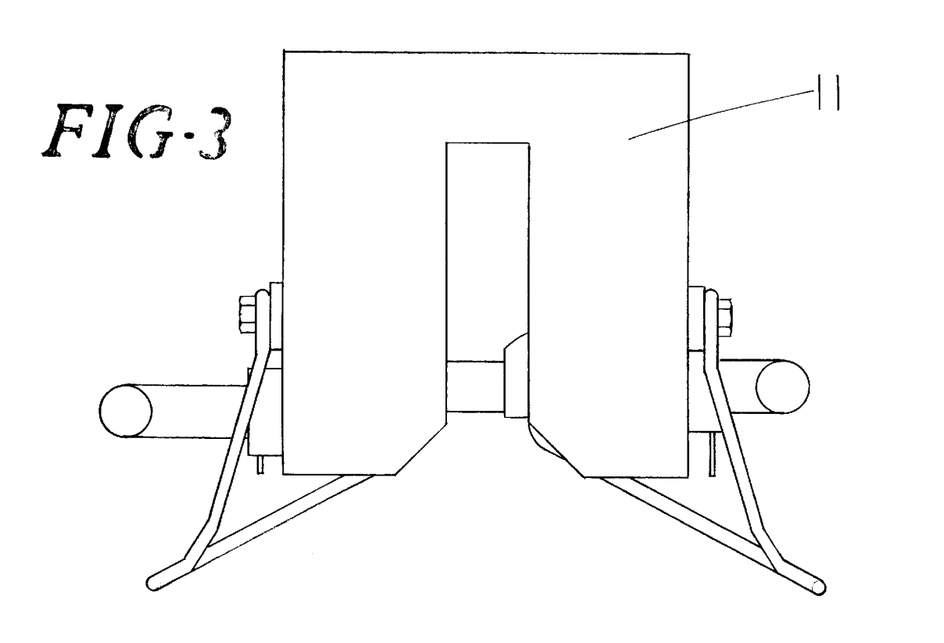
FIG. 3 is identical to FIG. 2 with structure notation.
Figure 4:
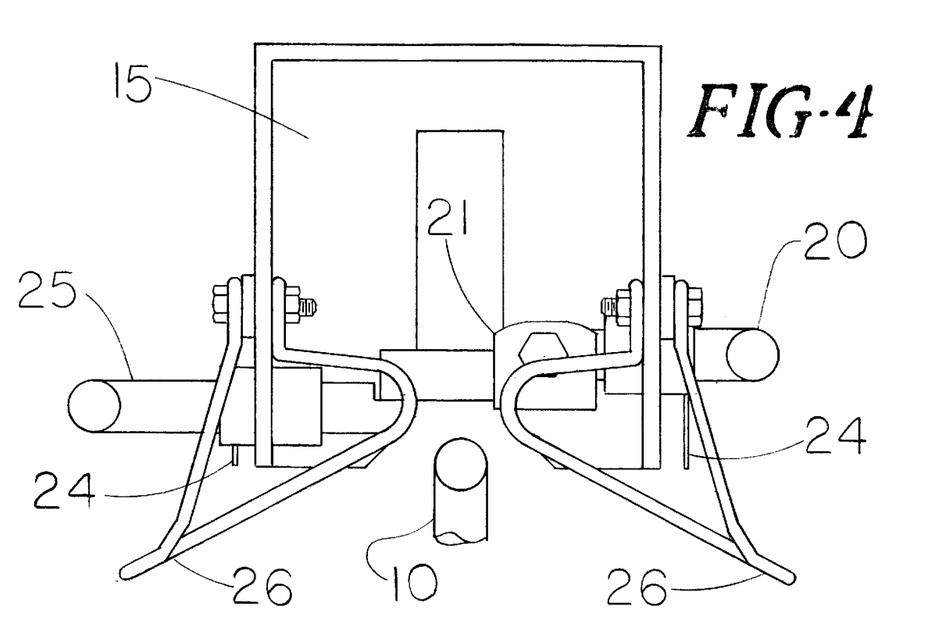
FIG. 4 is a top cross-sectional, partially cut-away view of the component parts of the invention as shown in FIG. 2, with the spring-loaded latch bolt and safety locking bolt and male latch member in the latching position.
Figure 5:
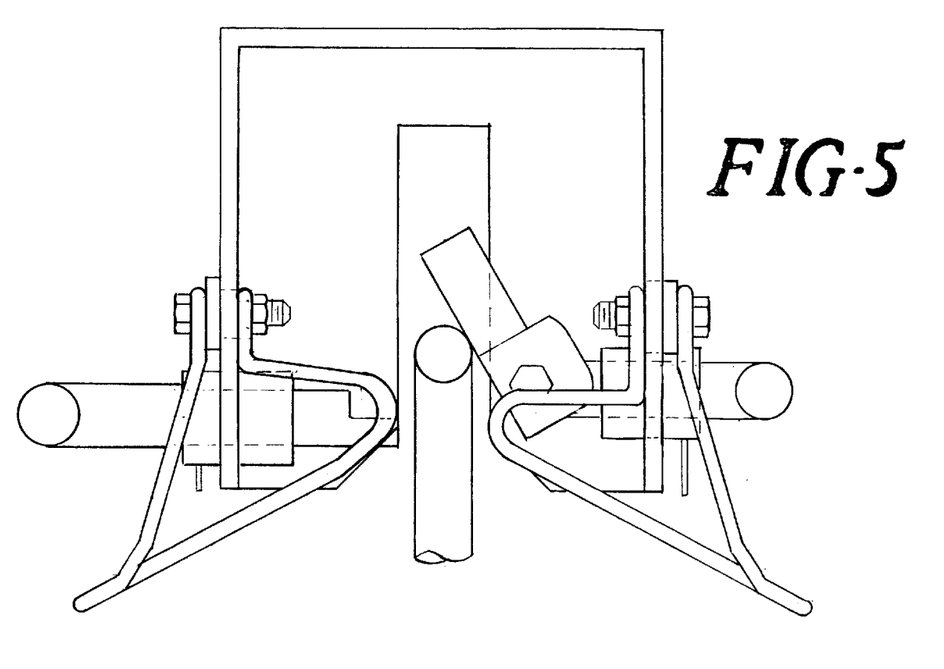
FIG. 5 is a top cross-sectional, partially cut-away view of the component parts of the invention as shown in FIG. 2, with the spring-loaded latch bolt and safety locking bolt and male latch member pushing into latching position.
Figure 6:
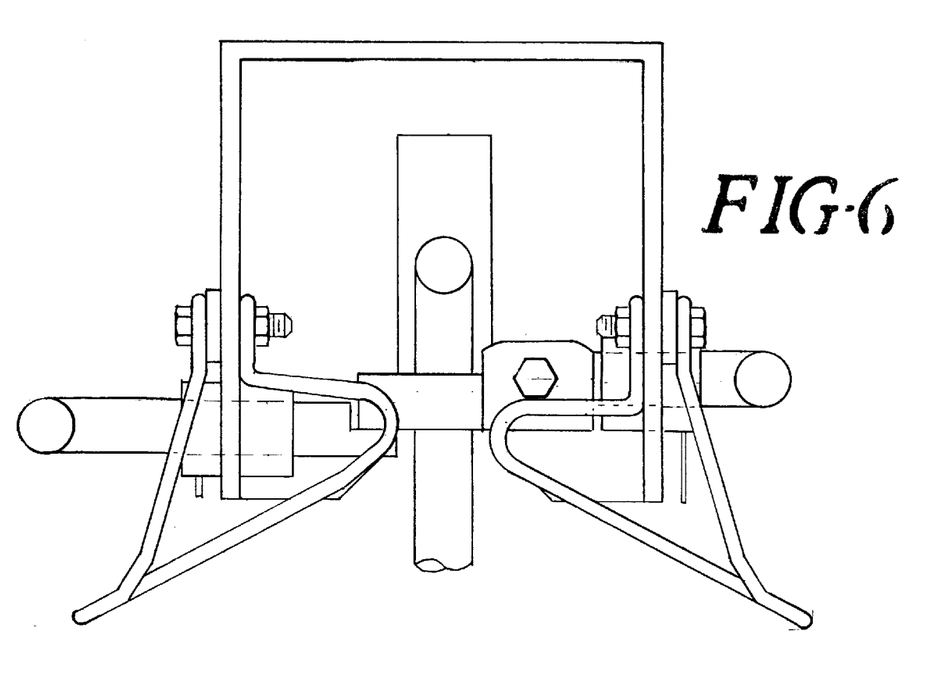
FIG. 6 is same as FIG. 5 but elongated bar is engaged in structure.
Figure 7:
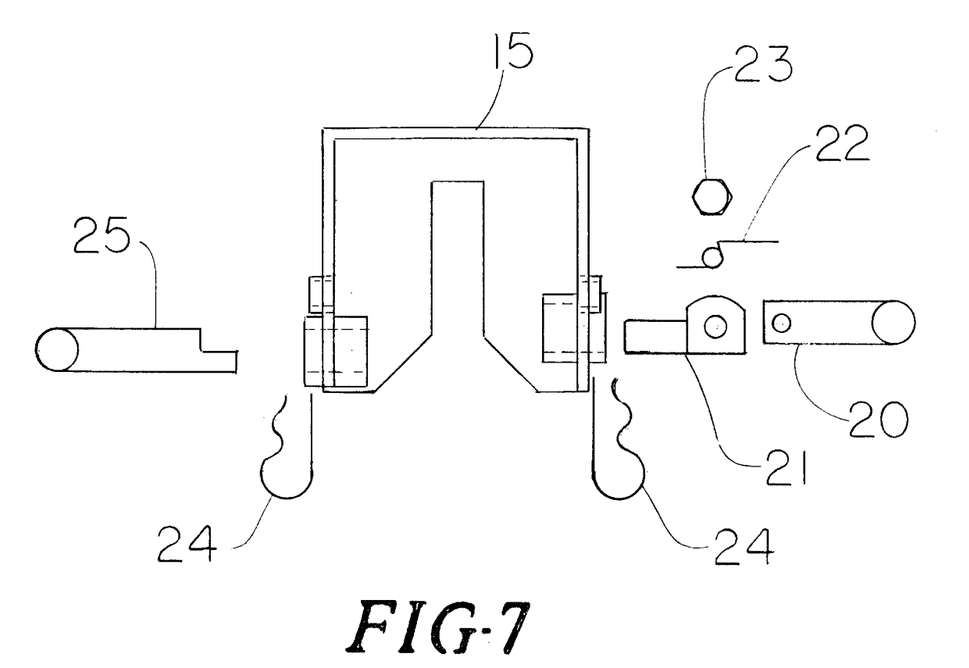
FIG. 7 is a breakdown of latch structure components and elongated bar.
Figure 11:
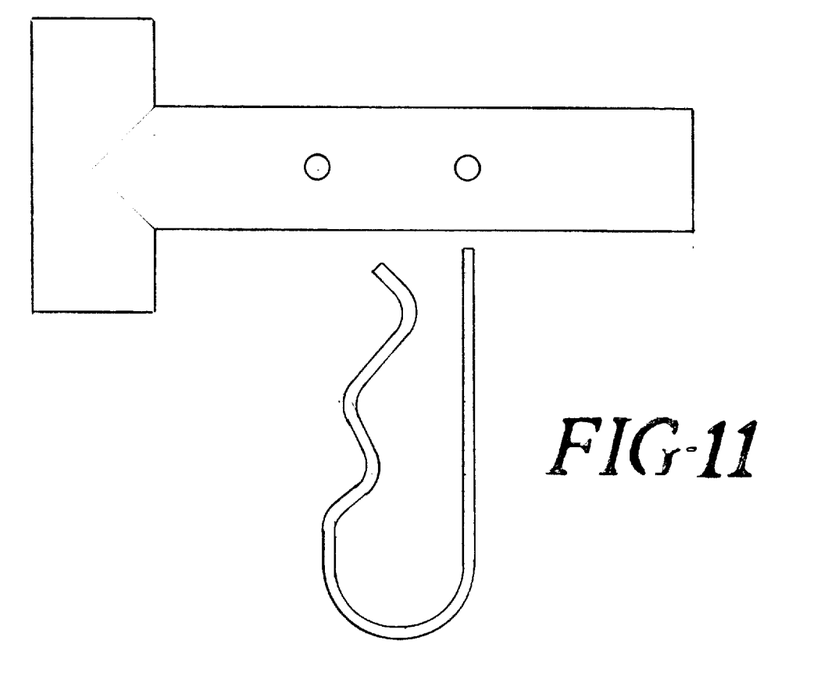
FIG. 11 is side view of FIG. 10.
Figure 12:
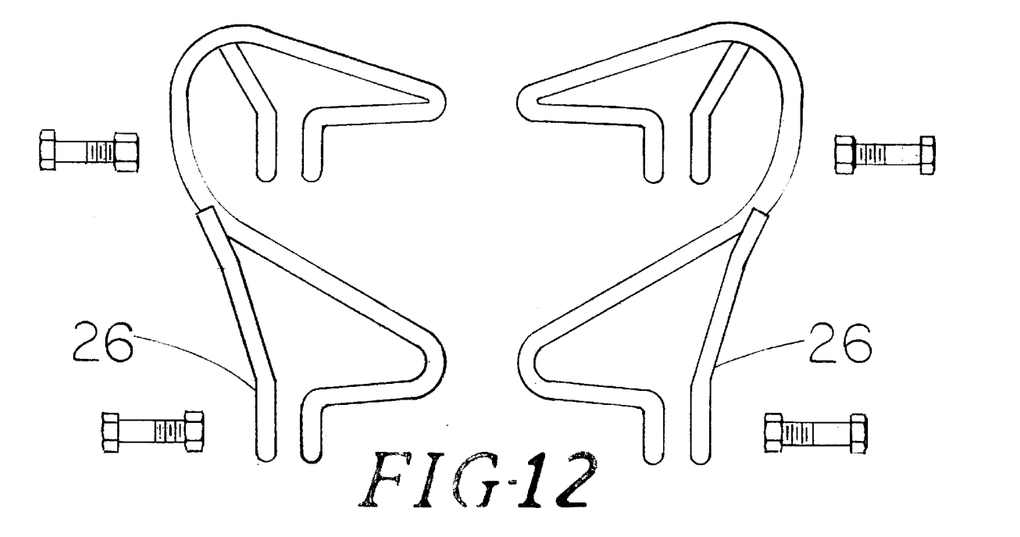
FIG. 12 is view of guide bars.
Figure 13:
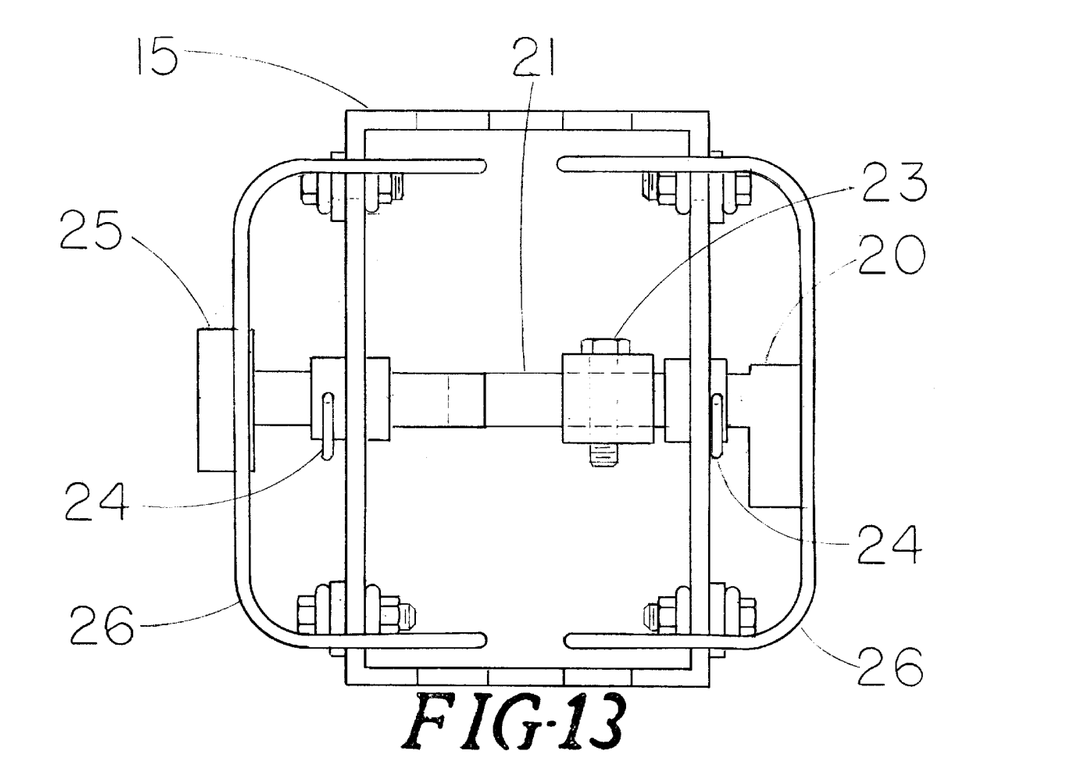
FIG. 13 is front view of latching structure with all components in locking position.

The automatic latching feature of the invention is activated when the latch bar 10 strikes the swivel end 21 of the bolt 20, pushing the swivel end forward, FIG. 5. When latch bar 10 passes by swivel end 21 spring 22 will force swivel end 21 in its latching position, rearward of the latch bar 10, as shown in FIG. 6. The latch bolt is slidably received in a side of the housing as shown in FIGS. 7 and 13. The latch bolt is retained in the side structure of the housing via a cotter pin 24 as detailed in the figures. As shown in FIG. 13, the latch bolt includes a perpendicularly extending handle end means which allows rotation of the latch bolt one half turn within the housing from receiving to releasing positions. A safety lock bolt 25 is horizontally slidably mounted within a side of the housing opposite the side of the housing mounting the latch bolt as shown in FIG. 3. The safety lock bolt is additionally held in the housing side by a cotter pin 24. When it is desired to release a boat from the latch assembly, the locking pin 24 on the safety lock bolt is pulled and the safety lock bolt is pulled out to its releasing position and repinned—note the receiving and releasing position apertures for the locking pin 24 shown in FIG. 11. The latch bolt is unpinned (i.e. element 24 is removed), the latch bolt is rotated one half turn via the end mounted handle means and repinned in the housing such that the pivoting spring loaded end 21 of the latch bolt allows release of the captured latch bar.

It will be seen that a funnel means to guide the latch bar 10 into the slot has been provided, by two guide bars 26. Said guide bars extend rearwardly and diverge outwardly from slot. In doing so, they provide a wide mouth target for the latch bar 10 and serve to guide or direct said latch bar into the slot. The guide bars 26 are affixed to the housing 15 by bolt fasteners 23.

The funnel means provided by the guide bars 26 serves to act as a guide for directing the latch bar 10 into the receiving slot. In addition it serves to help align the boat vertically by contacting the latch bar along its vertical extension.

WHEREAS a preferred embodiment of the invention has been illustrated and described in detail, it will be apparent that various changes may be made in the disclosed embodiment, without departing from the spirit of the invention.

I claim the following as my invention:

1. A latch assembly for latching a boat to a boat trailer, the latch assembly comprising:

a latch bar adapted to be secured to the prow of the boat and including an elongated generally vertically extending latch bar portion spaced forwardly from the prow; and a latch structure adapted to be mounted on the forward end of the boat trailer and including a housing defining a vertically extending slot opening in rear, upper, and lower faces of the housing and sized to receive the latch bar portion therein, a latch bolt slidably received in a side of the housing, a spring-loaded end pivotally attached to the bolt and biased by a spring to a position across said slot, and a perpendicularly extending handle end means mounting the bolt on the housing for rotating movement from receiving and retracting positions, a safety lock bolt slidably mounted in a side of the housing opposite the side of the housing mounting the latch bolt, a respective locking pin for securing the latch bolt and the safety lock bolt in receiving and releasing positions within the housing.

2. A latch assembly according to claim 1 wherein:

the latch structure further includes funnel means extending rearwardly from said slot and operative to direct said latch bar portion into said slot.

3. A latch assembly according to claim 2 wherein:

the funnel means comprises two guide bars extending rearwardly from an entrance to said slot and diverging rearwardly so as to provide a wide mouth target for the latch bar portion.

4. A latch assembly according to claim 1 wherein:

the vertical extent of the latch bar portion is at least as great as the vertical extent of the slot.

5. A latch assembly according to claim 1 wherein:

the latch assembly is configured such that when releasing a boat from the trailer, the locking pin on the safety lock bolt is pulled and the safety lock bolt is pulled out to its releasing position and repinned, then the locking pin is pulled on the spring-loaded latch bolt and the spring-loaded latch bolt is turned one half turn and repinned, allowing the latch bar to swivel the spring-loaded end rearward to free the latch bar from the latching assembly.

* * * * *